United States Patent
Link et al.

(10) Patent No.: US 7,116,959 B1
(45) Date of Patent: Oct. 3, 2006

(54) APPARATUS FOR SELECTING A RECEIVER AMONG A PLURALITY OF RECEIVERS IN A DIVERSITY RECEIVER SYSTEM BASED UPON AUTOMATIC GAIN CORRECTION

(75) Inventors: Hermann Link, Donaueschingen-Grueningen (DE); Stefan Schradi, Villingen-Schwenningen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 09/509,643

(22) PCT Filed: Sep. 30, 1997

(86) PCT No.: PCT/DE98/02906

§ 371 (c)(1),
(2), (4) Date: Jul. 24, 2000

(87) PCT Pub. No.: WO99/17464

PCT Pub. Date: Apr. 8, 1999

(30) Foreign Application Priority Data

Sep. 30, 1997 (DE) ................................ 197 43 123

(51) Int. Cl.
*H04N 5/44* (2006.01)
(52) U.S. Cl. .................... 455/277.1; 455/134; 455/136; 455/140; 455/247.1
(58) Field of Classification Search ............. 455/277.1, 455/277.2, 134, 133, 138, 150.1, 177.1, 247.1, 455/250.1, 135–136, 303; 348/614, 725; 725/75, 120
See application file for complete search history.

(56) References Cited

U.S. PATENT DOCUMENTS

| | | | |
|---|---|---|---|
| 4,255,816 A | | 3/1981 | Grunza et al. .............. 455/277 |
| 4,578,819 A | * | 3/1986 | Shimizu ...................... 455/135 |
| 4,953,197 A | | 8/1990 | Kaewell, Jr. et al. ......... 379/58 |
| 5,241,701 A | * | 8/1993 | Andoh ........................ 455/272 |
| 5,263,180 A | * | 11/1993 | Hirayama et al. .......... 455/139 |
| 5,303,396 A | * | 4/1994 | Ooyagi et al. .............. 455/134 |
| 5,335,010 A | * | 8/1994 | Lindemeier et al. ........ 348/706 |
| 5,339,452 A | | 8/1994 | Sugawara .................... 455/212 |
| 5,361,404 A | * | 11/1994 | Dent ........................... 455/135 |
| 5,390,342 A | * | 2/1995 | Takayama ................... 455/134 |
| 5,513,222 A | * | 4/1996 | Iwasaki ....................... 375/347 |
| 5,535,440 A | * | 7/1996 | Clappier ..................... 455/134 |
| 5,541,963 A | | 7/1996 | Nakagoshi .................. 375/347 |

(Continued)

FOREIGN PATENT DOCUMENTS

| | | |
|---|---|---|
| GB | 1 487 550 | * 10/1977 |
| WO | WO 97/09792 | 3/1997 |

*Primary Examiner*—William Trost
*Assistant Examiner*—Brandon J. Miller
(74) *Attorney, Agent, or Firm*—O'Shea, Getz & Kosakowski, P.C.

(57) ABSTRACT

A diversity receiver system includes a plurality of radio receivers that each provide a uniquely associated receiver output signal and a uniquely associated receiver control signal indicative of the amount of gain applied by the associated radio receiver to create the uniquely associated receiver output signal. A selection mechanism receives the receiver control signals, and determines which of the radio receivers has applied the smallest gain correction to its associated receiver output signal, and provides a diversity receiver output signal indicative of the receiver output signal associated with the receiver that applied the smallest gain correction.

12 Claims, 1 Drawing Sheet

U.S. PATENT DOCUMENTS

| | | | |
|---|---|---|---|
| 5,559,838 A | 9/1996 | Nakagoshi | 375/347 |
| 5,712,690 A * | 1/1998 | Kim | 348/570 |
| 5,722,060 A * | 2/1998 | Horigome | 455/234.1 |
| 5,745,845 A * | 4/1998 | Suenaga | 455/194.1 |
| 5,777,693 A * | 7/1998 | Kishigami et al. | 348/731 |
| 5,818,543 A * | 10/1998 | Lee | 348/725 |
| 5,819,167 A * | 10/1998 | Lawrence | 455/254 |
| 5,940,143 A | 8/1999 | Igarashi et al. | 348/678 |
| 6,032,031 A | 2/2000 | Takaki | 455/245.2 |
| 6,067,449 A * | 5/2000 | Jager | 455/277.2 |
| 6,075,823 A * | 6/2000 | Sonoda | 375/267 |
| 6,115,591 A | 9/2000 | Hwang | 455/277 |
| 6,141,536 A | 10/2000 | Cvetkovic et al. | 455/45 |
| 6,169,888 B1 | 1/2001 | Lindenmeier et al. | 455/277.2 |
| 6,262,766 B1 * | 7/2001 | Schradi | 348/194 |

* cited by examiner

APPARATUS FOR SELECTING A RECEIVER AMONG A PLURALITY OF RECEIVERS IN A DIVERSITY RECEIVER SYSTEM BASED UPON AUTOMATIC GAIN CORRECTION

BACKGROUND OF THE INVENTION

The invention relates to diversity receivers, and in particular to selecting a receiver among a plurality of receivers in a diversity receiver system based upon automatic gain correction.

Diversity receiving systems with several receivers are used, for example, in vehicles. The receivers can be for example audio and video receivers.

Reception and reproduction of video pictures in stationary receiving stations poses no difficulties, because the reception conditions remain largely constant. On the other hand, the reception conditions for a mobile receiving station can vary considerably, depending on the nature of the terrain. For instance, if the mobile receiving station is situated in mountainous terrain, echoes can cause considerable interference with reception. In the radio shadow of mountains or hills, the radio connection can even break down completely, so that, in place of a video picture, only noise is visible on the screen.

In the meantime, motor vehicles such as, for example, passenger cars, long-distance buses, and railroad cars, are being equipped with television receivers and screens, so that messages can be displayed, for example traffic reports sent by video text, or, the travelers can be entertained with television programs. The receiving conditions in a moving receiving station vary considerably in some circumstances, due to the terrain through which the receiving station is currently passing. Consequently, this will subject the travelers who are watching television to unpleasant and considerable eye strain, because the picture quality can vary to a great extent. For example, if the vehicle is passing through a radio shadow, the viewers will see only noise on the screen. Looking at a television program with such interference subjects the viewers to fatigue rather than entertainment.

It is known that the reception of radio signals in mobile receiving stations can be improved by multi-path reception, also referred to as "diversity." By antenna diversity is understood a receiver which can be connected to one of several antennas, generally spatially separated from one another, while by frequency diversity is understood a system consisting of several receivers which receive the same signals or the same programs on different frequencies. The signals delivered by the antennas in the case of antenna diversity and by the receivers in the case of frequency diversity are tested for their quality so as to forward and process the best quality signal.

SUMMARY OF THE INVENTION

It is therefore the object of the invention to specify, for a diversity receiving system with several receivers, to select the receiver with the best reception.

The invention achieves this object by comparing the levels of the control signals of the automatic gain control of the receivers, and selecting that receiver whose control signal has the lowest level.

The invention starts from the idea that the level of the control signal of the automatic gain control of a receiver (e.g., a television receiver) is a measure of the reception level. If the level of the control signal reaches its maximum, the reception level is too low; on the other hand, if the level of the control signal reaches its minimum, the reception level lies in the optimum range.

DETAILED DESCRIPTION OF THE DRAWING

Figure 1:
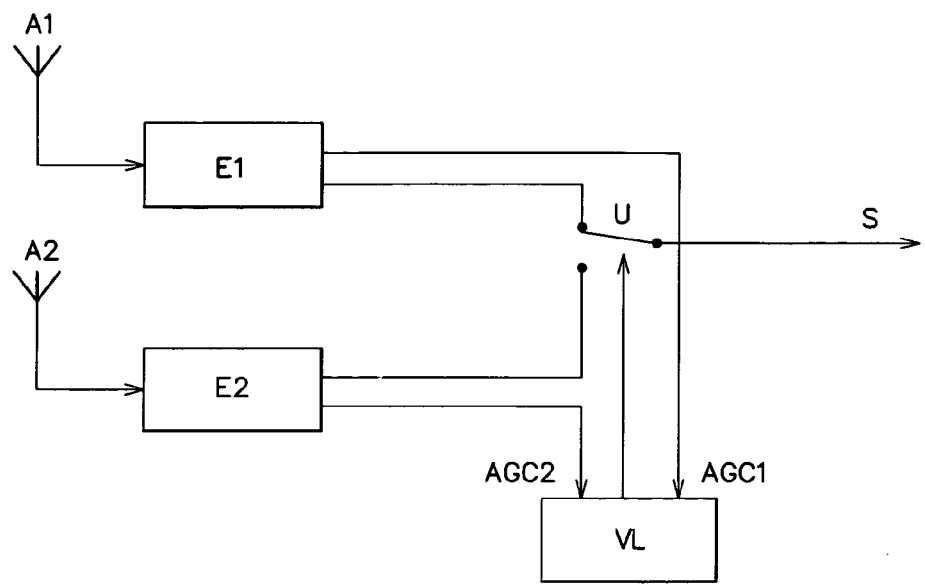
FIG. 1 is a block diagram illustration of a first embodiment of the invention.

Referring to FIG. 1, two receivers E1 and E2 (e.g., television receivers) receive the same program, with an antenna A1 and A2, respectively. The two control signals AGC1 and AGC2 of the two receivers E1 and E2 are compared in a comparator VL. Via the controllable changeover switch U, the comparator VL selects the output of that receiver whose control signal has the lower level. Consequently, the output signal S of the receiver whose control signal has the lower level is always forwarded for further processing. More than two receivers can also exist here.

Figure 2:
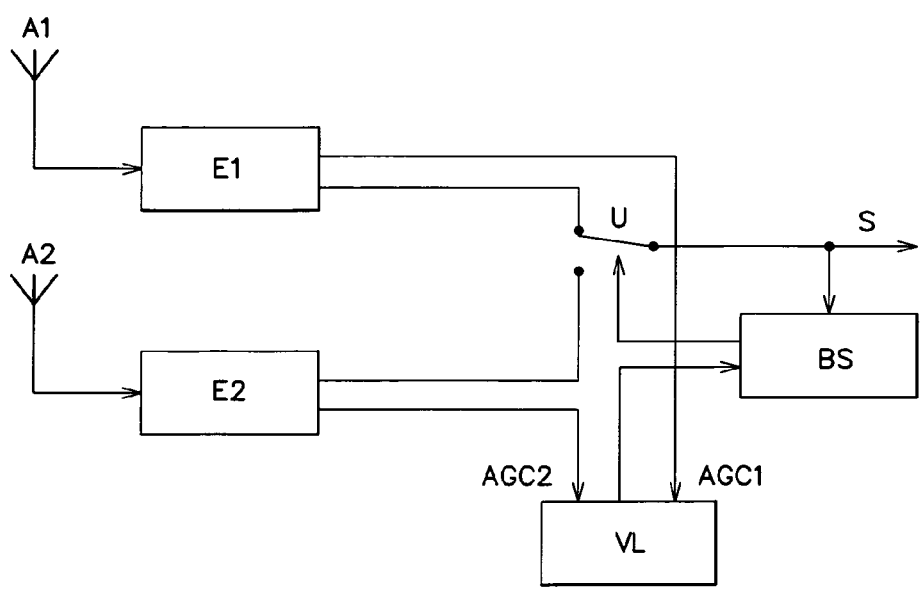
FIG. 2 is a block diagram illustration of a second embodiment of the invention.

The second embodiment of the invention, shown in FIG. 2, will now be described and explained.

The second embodiment differs from the first one in that the output of the comparator VL is not connected to the control input of the controllable changeover switch U, but to the first control input of a block synchronizer BS. The output signal S of one of the two receivers E1 or E2 is conducted to the second control input of the block synchronizer BS. The control output of the block synchronizer BS is connected to the control input of the controllable changeover switch U.

The second embodiment of the invention is suited for the block transmission of signals. The block synchronizer BS receives from the comparator VL a control signal for switching over to one receiver if the level of the control signal of the other receiver becomes greater than the level of the control signal of the first receiver. However, the block synchronizer BS does not switch over to another receiver immediately, but only at the end or beginning of a block. In other words, the block synchronizer BS executes switchover processes with block synchronization. No switchovers are executed within a block.

The second embodiment is especially well suited for a diversity receiving system with television receivers. The switchover process from one receiver to another takes place with line or picture synchronization.

With a third advantageous embodiment of the invention, switchover to another receiver occurs only if the lowest level differs from the levels of the other control signals by a specific minimum value. This measure of providing a hysteresis prevents unnecessary switchover processes.

A special advantage of the invention is that the control signal is present in any case, and the invention can be implemented with only small expense—only a comparator and a controllable changeover switch are needed.

The invention is not limited to television receivers. It is suited for receivers of all kinds for diversity receiving systems. The invention is especially suited for mobile diversity receiving systems, such as are installed for example in vehicles. This can apply to audio and/or video receiving systems. A future application for digital audio transmission is also conceivable.

What is claimed is:

1. A receiver selection system that provides an output signal selected from at least first and second radio receivers, the selection system comprising:
   a comparator that receives a first control signal from one of the radio receivers and a second control signal from another of the radio receivers, and determines which of the control signals has the lowest level value and provides a selection signal indicative of the selected control signal; and
   a switching element responsive to the selection signal, which receives a first data signal from the first radio receiver and a second data signal from the second radio receiver, and based upon the state of the selection signal selects as the output signal either the first data signal or the second data signal, where
   the first control signal is indicative of the amount of gain applied by first automatic gain control circuitry of the first radio receiver to create the first data signal, and the second control signal is indicative of the amount of gain applied by second automatic gain control circuitry of the second radio receiver to create the second data signal.

2. The receiver selection system of claim 1, where the first and second data signals include audio data.

3. The receiver selection system of claim 1, where the first and second data signals include video data.

4. A diversity receiver system, comprising:
   a plurality of radio receivers that each provide a uniquely associated receiver output signal and a uniquely associated receiver control signal indicative of the amount of gain applied by the associated radio receiver to create the uniquely associated receiver output signal; and
   a selection mechanism that receives the receiver control signals, and determines which of the radio receivers has applied the smallest gain correction to its associated receiver output signal, and provides a diversity receiver output signal indicative of the receiver output signal associated with the receiver that applied the smallest gain correction.

5. The diversity receiver system of claim 4, where the selection mechanism comprises a block synchronizer that delays switching/coupling the diversity receiver output signal from selection of a first of the radio receivers to a second of the radio receivers in response to the receiver control signals, until the first of the radio receivers has completed transmitting a predefined block of data.

6. The diversity receiver system of claim 5, where the selection mechanism comprises:
   a comparator that compares the receiver control signals to determine which of the radio receivers has applied the smallest gain correction to its associated receiver output signal, and provides a selection signal indicative thereof; and
   means responsive to the selection signal and the receiver output signals for coupling a selected one of the receiver output signals to the diversity receiver output signal based upon the state of the selection signal.

7. The diversity receiver system of claim 5, where the plurality of radio receivers comprises a plurality of television receivers.

8. The diversity receiver system of claim 5, where the plurality of radio receivers comprises a plurality of audio receivers.

9. The receiver selection system of claim 1, comprising a block synchronizer that delays switching/coupling the output signal from selection of the first data signal to the second data signal in response to the selection signal, until the first data signal has completed transmitting a predefined block of data.

10. The diversity receiver system of claim 4, where the selection mechanism comprises:
    a comparator that compares the receiver control signals to determine which of the radio receivers has applied the smallest gain correction to its associated receiver output signal, and provides a selection signal indicative thereof; and
    means responsive to the selection signal and the receiver output signals for coupling a selected one of the receiver output signals to the diversity receiver output signal based upon the state of the selection signal.

11. The diversity receiver system of claim 4, where the plurality of radio receivers comprises a plurality of television receivers.

12. The diversity receiver system of claim 4, where the plurality of radio receivers comprises a plurality of audio receivers.

* * * * *

UNITED STATES PATENT AND TRADEMARK OFFICE
CERTIFICATE OF CORRECTION

PATENT NO.        : 7,116,959 B1                                    Page 1 of 1
APPLICATION NO.   : 09/509643
DATED             : October 3, 2006
INVENTOR(S)       : Link et al.

It is certified that error appears in the above-identified patent and that said Letters Patent is hereby corrected as shown below:

Column 2 line 11, in the heading, delete "DRAWING" and insert --INVENTION--

Signed and Sealed this

Third Day of July, 2007

JON W. DUDAS
*Director of the United States Patent and Trademark Office*